Patented Nov. 12, 1940

2,221,304

UNITED STATES PATENT OFFICE 2,221,304

RUBBER COMPOUND

Henry Wilson, New Orleans, La., assignor to The Process Rubber Corporation, New Orleans, La., a corporation of Louisiana No Drawing. Application October 6, 1939, Serial No. 298,241

7 Claims. (Cl. 106—39)

The invention relates to the composition of matter and the article produced thereby as well as the method of compounding such composition.

It is one of the objects of the invention to provide a rubberlike compound which is made of the following ingredients:

Crude petroleum
Vegetable matter
Sulphur chloride
Powdered talc
Magnesium oxide
Caustic soda
Water
Carbon black, and
Benzol mixed together so as to produce a rubberlike mass.

Another object of the invention is to provide a rubber compound by soaking vegetable matter and crude petroleum and adding a filler and coagulating ingredients to the resultant liquor.

Another object of the invention is to soak vegetable matter in crude petroleum for a considerable period of time and to then add a small amount of benzol thereto before draining off the resultant liquor, mixing coloring matter and benzol, powdered talc and magnesium oxide with the liquor, adding caustic soda and water to the mass to obtain a coagulation and molding the coagulated mass in the desired form.

Other and further objects of the invention will be readily apparent when the following detailed description is considered.

The apparatus used in performing the method or process can be readily obtained and it is believed that it has no particular bearing upon the method and need not be illustrated.

In order to practice the invention the following detailed procedure should be substantially followed and for purposes of illustration an example will be given for obtaining approximately one hundred pounds of the rubberlike substance with the understanding that batches of any desired size, following the same proportions, can be compounded:

About 64 parts, by weight, of crude petroleum is placed in a wooden vat, which may have been previously treated by soaking with crude petroleum so that the resins or wood oils will not enter into the mix in the vat.

About 20 parts, by weight, of green vegetable matter will be immersed in the crude petroleum either by suspending it in trays or in rotatable drums so long as the oil and the vegetable matter are in close contact and intimately mixed. The purpose of the immersion is to cause the petroleum to extract from the vegetable matter the gumlike properties. Any suitable vegetable matter may be used, such as alfalfa, red or white clover, rag weed, golden rod, wild palmetto, sugar cane, corn stalks, or millet stalks, all of which have more or less gumlike properties when they are disseminated. If the wooden vat remains at atmospheric temperature the soaking period should extend for approximately sixteen days. If steam at low pressure is introduced into the vat so as to obtain a heating thereof which does not extend to 212° Fahrenheit the soaking period may be shortened to approximately eight days.

About twelve hours before the expiration of the soaking period 1 and ½ parts of benzol or benzine will be added to the vat and sufficient agitation accomplished to cause mixing.

The liquor from the vat is now drawn off and placed in a suitable mixing container which may have any suitable type of mixing paddles or blades so that the liquor may be rapidly agitated.

If the rubber composition is to be colored a suitable coloring material will be first added. If a black material is to result 3 parts of carbon black will be added along with 1 and ¼ parts of benzol or benzine, and the liquor mixed with these materials. After this is thoroughly mixed 4 parts of powdered talc and 4 parts of light magnesium oxide will be thoroughly mixed in. In order to obtain a coagulation of this mix 2 and ½ parts of caustic soda will now be mixed into the mass and gradual coagulation occurs while the mass becomes heated due to the mechanical reaction. The mass while in this state is mixed rapidly and 10 parts of sulphur chloride are added over a period of about six minutes. The mixing is then continued for an additional eight minutes thereafter, whereupon the mass should become coagulated in a thick plastic mass which can hardly be mixed with the paddles or blades.

The mass is now poured into a suitably heated mold where pressure may be applied to it to solidify it ready for future use in molding and vulcanizing into the desired shape or configuration.

It has been found in actual practice that a composition compounded in accordance with the foregoing method results in a very tough resilient rubber composition which is superior to the natural rubber compositions and which can be manufactured at a price which is a mere fraction of the present cost of natural crude rubber.

Broadly the invention contemplates the compounding of an artificial rubberlike composition which can be molded, treated or otherwise substituted for natural crude rubber.

What is claimed is:

1. An article of manufacture which comprises the following ingredients mixed and heated in the following proportions by weight, crude oil 64, vegetable matter 20, sulphur chloride 10, powdered talc 4, magnesium oxide 4, caustic soda 2½, water 1½, carbon black 3, and benzol 1¼.

2. A resilient composition of matter including in combination crude petroleum, vegetable matter, sulphur chloride, powdered talc, magnesium oxide, caustic soda, water, carbon black, and benzol.

3. A resilient composition of matter including in combination crude petroleum, vegetable matter, sulphur chloride, powdered talc, magnesium oxide, caustic soda, water, carbon black, and benzol mixed and heated to provide a body of resilient matter resembling rubber.

4. A method of compounding a rubber like material comprising the steps of immersing vegetable matter in crude petroleum, adding benzol to the mix and straining off the resultant liquor, adding sulphur chloride, powdered talc, magnesium oxide, carbon black, caustic soda, water, and benzol to the liquor while stirring the liquor.

5. A method of compounding a rubber like material comprising the steps of immersing vegetable matter in crude petroleum, adding benzol to the mix and straining off the resultant liquor, adding sulphur chloride, powdered talc, magnesium oxide, carbon black, caustic soda, water, and benzol to the liquor while stirring the liquor, and heating the resultant coagulated mix under pressure in a mold.

6. The process of making a rubber like substance which comprises placing substantially sixty four parts by weight of crude petroleum in a vat; immersing twenty parts by weight of green vegetable matter such as alfalfa in the petroleum in the vat, periodically agitating the vegetable matter for approximately sixteen days so that the petroleum takes up the gum like substances from the matter, mixing in one and one half parts of benzol about twelve hours before the expiration of the soaking period, drawing off the resultant liquor, placing such liquor in a mixing container and mixing in three parts of carbon black, and one and one quarter parts of benzol then mixing in four parts of commercial powdered talc, four parts of magnesium oxide and stirring the mix rapidly, to coagulate the mix two and one half parts of caustic soda and one and one half parts of water are added, as the mixing continues ten parts of sulphur chloride are added within six minutes and the mixing continued for eight minutes thereafter.

7. The process of making a rubber like substance which comprises placing substantially sixty four parts by weight of crude petroleum in a vat; immersing twenty parts by weight of green vegetable matter such as alfalfa in the petroleum in the vat, periodically agitating the vegetable matter for approximately sixteen days so that the petroleum takes up the gum like substances from the matter, mixing in one and one half parts of benzol about twelve hours before the expiration of the soaking period, drawing off the resultant liquor, placing such liquor in a mixing container and mixing in three parts of carbon black, and one and one quarter parts of benzol then mixing in four parts of commercial powdered talc, four parts of magnesium oxide and stirring the mix rapidly, to coagulate the mix two and one half parts of caustic soda and one and one half parts of water are added, as the mixing continues ten parts of sulphur chloride are added within six minutes and the mixing continued for eight minutes thereafter, and depositing the mass in a heated mold under pressure to form the desired configuration.

HENRY WILSON.